UNITED STATES PATENT OFFICE.

AUGUSTE J. ROSSI, OF NIAGARA FALLS, NEW YORK, ASSIGNOR TO THE TITANIUM ALLOY MANUFACTURING COMPANY, OF NEW YORK, N. Y., A CORPORATION OF MAINE.

COMPOUND OR ALLOY OF TITANIUM AND SILICON.

1,019,526.     Specification of Letters Patent.     Patented Mar. 5, 1912.

No Drawing.     Application filed September 14, 1909. Serial No. 517,546.

*To all whom it may concern:*

Be it known that I, AUGUSTE J. ROSSI, a citizen of the United States, and a resident of Niagara Falls, in the county of Niagara and State of New York, have invented a certain new and useful Article of Manufacture, Being a Compound or Alloy of Titanium and Silicon, and a new and useful Process for the Production Thereof, of which the following is a specification.

The object of my present invention is to facilitate, economize in, and improve certain metallurgical processes and procedures and their resulting products, to wit, particularly the incorporation, when required, of silicon and titanium into other metals during manufacture, more especially the so-called "ferro-metals," and, not only this, but to impart to the metals, so treated with titanium and silicon, improved novel characteristics attributable to my novel procedures hereinafter described.

The beneficial characteristic effects of titanium upon other metals, notably iron, either as an alloy therewith, or in minute quantities as an eliminator of undesired compounds therefrom, are, by now, well understood; likewise the other characteristic advantages of introducing silicon into such other metals. In some instances I have found it particularly desirable to incorporate, at certain stages, with other metal, notably ferro-metals, both titanium and silicon. These manipulations, and their novel characteristic beneficial results, have hitherto, I believe, proved unattainable except by resort to introduction of separate and different charges, the one of silicon, and the other of titanium, or of a so-called "ferro-silicon," and, separately, of a "ferro-titanium," i. e., an alloy, or compound, of silicon on the one hand with other metal, and on the other hand of titanium with another metal, silicon being, strictly speaking, a metalloid, but industrially considered as metal, of which it has the appearance and many properties.

My researches and experiments have demonstrated that, by my hereinafter described novel procedure, it is possible to produce a compound, or alloy, of silicon with titanium, comprising also, if desired, a ferro or other metal, whereby the aforesaid characteristic beneficial effects of silicon and titanium separately introduced, and others resulting from their thus preliminary unison are imparted to other metals for various purposes.

My present invention thus consists in the production, on a commercial scale, and for the treatment of other metals industrially, of a new article, being a compound, or alloy, of titanium and silicon which may be designated silico-titanium, and of a practicable method of so producing said novel article.

My said method also includes the proportioning of the constituents in the final product to suit the special requirements of different manufactures, it being thereby possible to vary the silicon content from 20% to 75% of the whole, and the titanium content from 5% to 70%. In fact the variation of respective proportions is, by my said method, feasible to suit substantially all industrial requirements.

My said silico-titanium may be produced as follows, taking as an illustration in this instance a case in which is required in the final product 70% silicon and 30% titanium.

I thoroughly mix together white sand (*i. e.* practically pure silica), rutile (practically pure $TiO_2$) and powdered carbon in suitable proportions to insure the aforesaid resulting product according to the formulæ:—

$$SiO_2 + 2C = 2CO + Si$$
$$TiO_2 + 2C = 2CO + Ti$$

that is: 24 carbon for 60 silica and 80 rutile.

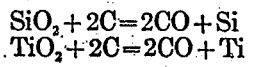

$$Si = \frac{28}{60} = \frac{7}{15} \text{ silica } Ti = \frac{48}{80} = 0.60 \text{ of } TiO_2.$$

Omitting the fractions in the atomic weights, and taking $C=12$; $Ti=48$; $Si=28$; $O=16$. This is at the rate of 0.40 carbon for 1 silica $(SiO_2)$. 0.30 carbon for 1 titanic acid $(TiO_2)$.

Those skilled in metallurgy can readily make the calculation that a mixture of 150 lbs. silica, 50 lbs. titanic acid, with 75 lbs.

carbon, would yield, theoretically 100 lbs. of an alloy containing 70 silicon; 30 titanium.

$$150 \text{ SiO}_2 \times \tfrac{7}{15} = 70 \text{ silicon}$$
$$50 \text{ TiO}_2 \times 0.6 = 30 \text{ titanium}$$
$$\Big\} 100 \text{ alloy}.$$

Such mixture would require:

$$150 \text{ SiO}_2 \times 0.40 = 60 \text{ carbon}$$
$$50 \text{ TiO}_2 \times 0.30 = 15$$
$$\overline{\phantom{00000}75 \text{ carbon.}}$$

My mixture having been prepared as above stated, the next step is to charge it into a furnace or other container constructed, and provided with means, to raise the charge to a temperature sufficiently high to insure reduction of the oxids by the carbon, and subsequent withdrawal for use of the resulting molten alloy or compound of silicon and titanium in elemental state. I have found it preferable to use for this purpose an electric furnace of any approved type, for instance an electric furnace containing therein two electrodes, or a furnace of the arc type, such as I have hitherto used in the reduction of metallic oxids and is illustrated and described in U. S. Letters Patent No. 802,941 granted to me on Oct. 24, 1908, for process for the reduction of metallic oxids, etc., but it is, of course, to be understood that I do not confine myself to this particular method of supplying the required heat to the charge, and that any apparatus adapted to produce and maintain sufficiently long a temperature adequate to reduce, by carbon, all of the $SiO_2$ and $TiO_2$ in the charge will subserve my purpose.

The above referred to electric furnace which I, however, prefer to use for this particular purpose, consists, essentially, as will be observed by reference to the specification and drawings of my aforesaid Letters Patent, in a masonry of graphite materials which constitutes the cathode, and containing within itself a centrally disposed cavity, the bottom of which constitutes the hearth, upon which is built the upper portions of the furnace of refractory materials, the whole being inclosed in an iron casing. Within said central cavity, the cathode, a carbon electrode is vertically movably supported and means supplied for imparting thereto such vertical motion. The electric current may be turned on by sufficiently lowering said anode, thus bringing it into therefor required approximation to cathode, whereupon the said mixture is charged in around said anode. The required reaction then sets in, resulting finally in entire reduction of the $SiO_2$ and $TiO_2$ by the carbon to metallic state, and the formation of the desired resulting molten alloy, which may be removed as usual through a tap hole.

In many instances, and for many purposes, I have found it of further advantage to incorporate into my novel silico-titanium, while being produced by my said method as above illustrated, a proportion of an additional metal, as for instance a ferro-metal, when said silico-titanium is designed for the treatment of ferro-metals, thus producing an alloy or compound of a ferro-metal, silicon and titanium in desired proportions, which may be termed a ferro-silico-titanium. In many instances such addition of the ferro-metal appears to facilitate and otherwise favorize the desired reduction of the oxid of titanium and silicon. Said ferro-silico-titanium may be produced by addition to my above described mixture of oxids of silicon and titanium of, for instance, scrap iron in any desired proportion. If, for instance, there be added to the said mixture 20 lbs. of such scrap and the charge subjected to the temperature above described, or even a lower temperature, a resulting metallic product, alloy, or compound, will be obtained, containing

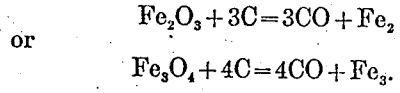

$$\begin{array}{l} \text{Iron} \quad 20 \text{ lbs.} \\ \text{Silicon} \quad 70 \text{ lbs.} \\ \text{Ti} \quad 30 \text{ lbs.} \end{array} \Big\} \text{ or } \Big\{ \begin{array}{l} \text{Fe} \quad 16.66+ \\ \text{Si} \quad 58.33+ \\ \text{Ti} \quad 25.00 \end{array}$$

$$\overline{120 \text{ lbs.}} \qquad \overline{100.00}$$

In lieu of iron scrap a pure hematite $Fe_2O_3$, or any other oxid of iron, may be similarly added to the mixture of silica and titanium oxid in such proportions as to yield, by its reduction, by required increased amount of carbon in the charge, a quantity of iron equal to 16.66 lbs. of scrap, according to formula $$Fe_2O_3 + 3C = 3CO + Fe_2$$

or $$Fe_3O_4 + 4C = 4CO + Fe_3.$$

The presence of the aforesaid ferric content in the mixture appears not only to facilitate the desired reduction of the silica and titanic acid and to insure the desired reactions at lower temperature than would otherwise be required, but it also appears to impart to the resulting product properties useful for certain purposes, as for instance greater fusibility, or capacity for dissolving, on said resulting products being added thereafter to ferro-metals in ordinary manufacture for the purpose of improving the same and imparting thereto the characteristic effects of silicon and titanium. I have also found that in cases where my said silico-titanium is employed, as it may be, for imparting to other than ferro-metals, as for instance particularly copper, desired improved properties and characteristics, it is likewise of advantage to incorporate into the charge of silico-titanic material in the furnace during reduction a proportion of cupric material, instead of ferric material, as for instance metallic copper or oxid of copper. The resulting product, alloy, or compound I may designate as a cupro-silico-titanium.

What I claim as new and desire to secure by Letters Patent is the following, viz:—

1. As a new article of manufacture a ternary alloy of titanium, silicon and iron, containing principally titanium and silicon.

2. The aforesaid method of producing an alloy or compound containing principally silicon and titanium associated with a smaller quantity of other metal which comprises incorporating such other metal with the oxids of silicon and titanium in presence of a deoxidizing agent and subjecting the whole to a temperature sufficient to insure reduction of said oxids of silicon and titanium.

AUGUSTE J. ROSSI.

Witnesses:
 EDWARD BRUCKNER,
 WILLIAM F. MEREDITH.